United States Patent
Harris et al.

(10) Patent No.: US 11,544,073 B2
(45) Date of Patent: Jan. 3, 2023

(54) SOFTWARE DEPLOYMENT OVER COMMUNICATION FABRICS

(71) Applicant: Liqid Inc., Broomfield, CO (US)

(72) Inventors: Henry Lee Harris, Redding, CA (US); James Scott Cannata, Denver, CO (US)

(73) Assignee: Liqid Inc., Broomfield, CO (US)

( * ) Notice: Subject to any disclaimer, the term of this patent is extended or adjusted under 35 U.S.C. 154(b) by 0 days.

(21) Appl. No.: 17/238,582

(22) Filed: Apr. 23, 2021

(65) Prior Publication Data

US 2021/0240486 A1    Aug. 5, 2021

Related U.S. Application Data

(63) Continuation of application No. 16/745,704, filed on Jan. 17, 2020, now Pat. No. 10,990,412, which is a continuation of application No. 16/245,330, filed on Jan. 11, 2019, now Pat. No. 10,540,185.

(51) Int. Cl.
*G06F 9/4401* (2018.01)
*G06F 13/42* (2006.01)
(Continued)

(52) U.S. Cl.
CPC .............. *G06F 9/4405* (2013.01); *G06F 8/60* (2013.01); *G06F 8/61* (2013.01); *G06F 8/63* (2013.01);
(Continued)

(58) Field of Classification Search
CPC . G06F 9/4405; G06F 8/60; G06F 8/61; G06F 8/63; G06F 9/4406; G06F 9/441;
(Continued)

(56) References Cited

U.S. PATENT DOCUMENTS

| | | | |
|---|---|---|---|
| 8,813,063 B2* | 8/2014 | Uthe | G06F 8/61 717/174 |
| 10,324,701 B1* | 6/2019 | Stickle | G06F 8/63 |
| 10,521,273 B2 | 12/2019 | Mullender | |
| 10,540,185 B1 | 1/2020 | Harris | |
| 10,990,412 B2* | 4/2021 | Harris | G06F 13/4022 |

(Continued)

FOREIGN PATENT DOCUMENTS

CN    101916172 B  *  8/2011

OTHER PUBLICATIONS

EPO Machine translation of CN 101916172 B (Year: 2011).*
International Application No. PCT/US2019/065663, International Search Report & Written Opinion, 8 pages, dated Feb. 24, 2020.

*Primary Examiner* — Glenn A. Auve

(57) ABSTRACT

Software configuration deployment techniques for disaggregated computing architectures, platforms, and systems are provided herein. In one example, a method includes presenting a user interface configured to receive instructions related to deployment of software to compute units, and receiving user selections of a software element for deployment to a compute unit comprising a processing element and a storage element. Responsive to the user selections, the method includes instructing a management processor of a communication fabric to deploy the software element for use by the compute unit by at least establishing a first partitioning in the communication fabric between the management processor and the storage element, deploying the software element to the storage element using the first partitioning, de-establishing the first partitioning, and establishing a second partitioning in the communication fabric between the processing element and the storage element comprising the software element, wherein the processing element operates using the software element.

20 Claims, 8 Drawing Sheets

(51) Int. Cl.
  *G06F 13/40*   (2006.01)
  *G06F 9/445*   (2018.01)
  *G06F 8/61*    (2018.01)
  *G06F 8/60*    (2018.01)

(52) U.S. Cl.
  CPC ............ *G06F 9/441* (2013.01); *G06F 9/4401* (2013.01); *G06F 9/445* (2013.01); *G06F 9/4406* (2013.01); *G06F 9/4408* (2013.01); *G06F 9/4416* (2013.01); *G06F 9/44505* (2013.01); *G06F 13/4022* (2013.01); *G06F 13/4221* (2013.01); *G06F 2213/0026* (2013.01)

(58) Field of Classification Search
  CPC .. G06F 9/445; G06F 9/44505; G06F 13/4022; G06F 13/4221; G06F 2013/0026
  See application file for complete search history.

(56) References Cited

U.S. PATENT DOCUMENTS

| | | |
|---|---|---|
| 2008/0148295 A1 | 6/2008 | Freimuth et al. |
| 2015/0026385 A1 | 1/2015 | Egi et al. |
| 2015/0373115 A1 | 12/2015 | Breakstone et al. |
| 2018/0046338 A1 | 2/2018 | Breakstone et al. |
| 2018/0046514 A1 | 2/2018 | Breakstone et al. |
| 2018/0165445 A1 | 6/2018 | Liguori et al. |
| 2018/0213669 A1 | 7/2018 | Kochukunju |
| 2018/0322081 A1 | 11/2018 | Breakstone et al. |
| 2019/0173734 A1 | 6/2019 | Nachimuthu et al. |
| 2019/0243953 A1 | 8/2019 | Fargo et al. |

\* cited by examiner

SOFTWARE DEPLOYMENT OVER COMMUNICATION FABRICS

RELATED APPLICATIONS

This application is a continuation of, and claims priority to, U.S. patent application Ser. No. 16/745,704, entitled "SOFTWARE CONFIGURATION DEPLOYMENT IN CLUSTERED COMPUTING," and filed Jan. 17, 2020 (U.S. Pat. No. 10,990,412, with an issue date of Apr. 27, 2021). This application is also a continuation of, and claims priority to, U.S. patent application Ser. No. 16/245,330, entitled "SOFTWARE DEPLOYMENT IN DISAGGREGATED COMPUTING PLATFORMS," and filed Jan. 11, 2019 (U.S. Pat. No. 10,540,185, with an issue date of Jan. 21, 2020).

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments.

Overview

Software configuration deployment techniques for disaggregated computing architectures, platforms, and systems are provided herein. In one example, a method includes presenting a user interface configured to receive instructions related to deployment of software to compute units, and receiving user selections of a software element for deployment to a compute unit comprising a processing element and a storage element. Responsive to the user selections, the method includes instructing a management processor of a communication fabric to deploy the software element for use by the compute unit by at least establishing a first partitioning in the communication fabric between the management processor and the storage element, deploying the software element to the storage element using the first partitioning, de-establishing the first partitioning, and establishing a second partitioning in the communication fabric between the processing element and the storage element comprising the software element, wherein the processing element operates using the software element.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
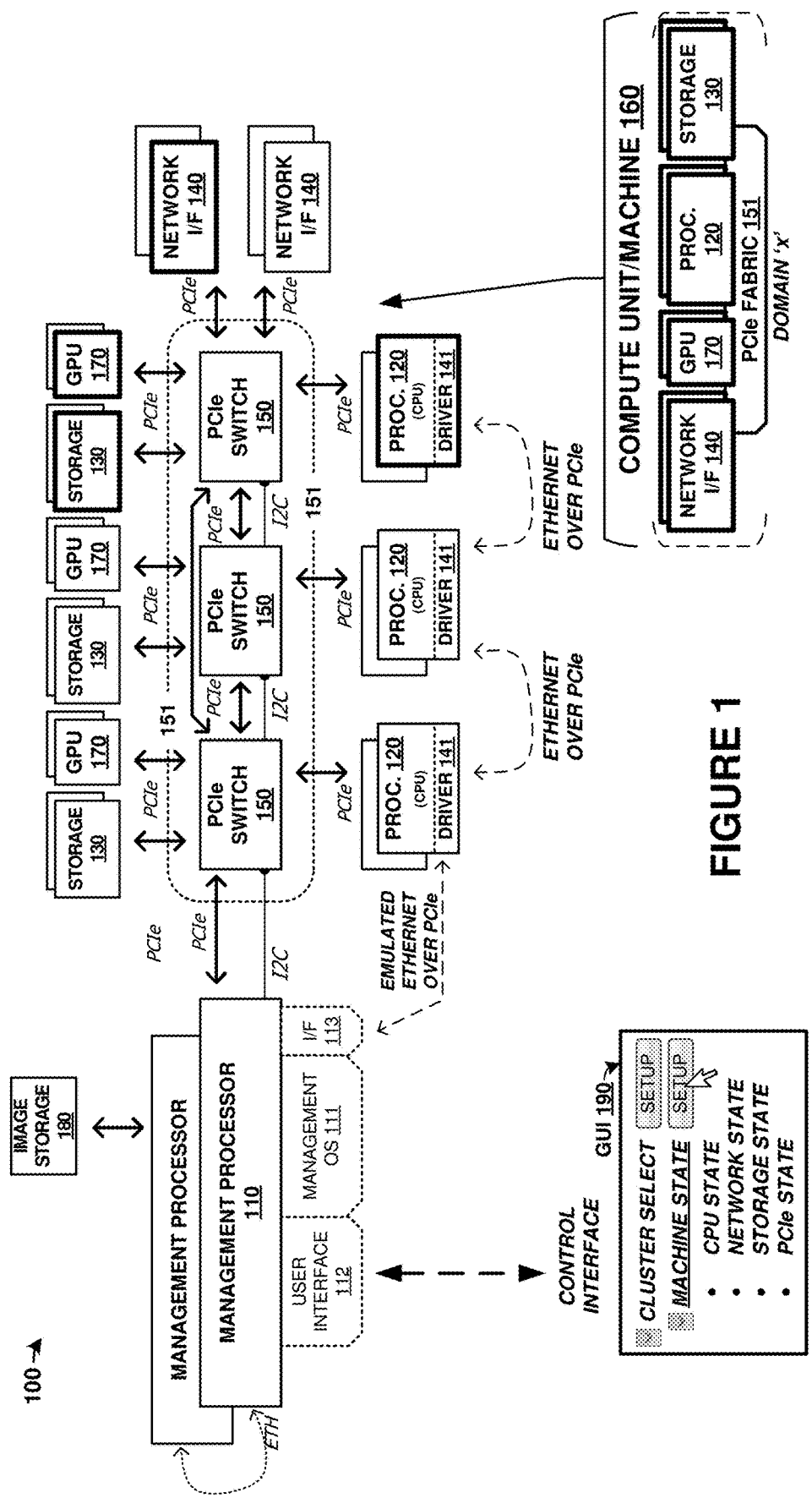
FIG. 1 is a diagram illustrating a computing platform in an implementation.

FIG. 1 is a system diagram illustrating computing platform 100. Computing platform 100 includes one or more management processors 110, and a plurality of physical computing components. The physical computing components include CPUs of processing modules 120, storage units 130, network modules 140, Peripheral Component Interconnect Express (PCIe) switch modules 150, and graphics processing units (GPUs) 170. These physical computing components are communicatively coupled over PCIe fabric 151 formed from PCIe switch elements 150 and various corresponding PCIe links. PCIe fabric 151 configured to communicatively couple a plurality of plurality of physical computing components and establish compute units using logical partitioning within the PCIe fabric. These compute units, referred to in FIG. 1 as machine(s) 160, can each be comprised of any number of CPUs of processing modules 120, storage units 130, network interfaces 140 modules, and GPUs 170, including zero of any module. The computing platform 100 may further include an image storage 180 that may communicatively couple with the management processors 110 and which may store operating system images or other operating system data that may be deployed to storage units 130 and may be used in operating the compute units 160. Depending on the implementation, image storage 180 may be coupled to one or more of management processors 110 via sideband interfaces, isolated PCIe interfaces, over PCIe fabric 151, or through various other arrangements.

The components of platform 100 can be included in one or more physical enclosures, such as rack-mountable units which can further be included in shelving or rack units. A predetermined number of components of platform 100 can be inserted or installed into a physical enclosure, such as a modular framework where modules can be inserted and removed according to the needs of a particular end user. An enclosed modular system, such as platform 100, can include physical support structure and enclosure that includes circuitry, printed circuit boards, semiconductor systems, and structural elements. The modules that comprise the components of platform 100 are insertable and removable from a rackmount style of enclosure. In some examples, the elements of FIG. 1 are included in a 2U chassis for mounting in a larger rackmount environment. It should be understood that the components of FIG. 1 can be included in any physical mounting environment, and need not include any associated enclosures or rackmount elements.

Once the components of platform 100 have been inserted into the enclosure or enclosures, the components can be coupled over the PCIe fabric and logically isolated into any number of separate compute units called "machines" or compute blocks. The PCIe fabric can be configured by management processor 110 to selectively route traffic among the components of a particular processor module and with external systems, while maintaining logical isolation between components not included in a particular processor module. In this way, a flexible "bare metal" configuration can be established among the components of platform 100. The individual compute blocks can be associated with external users or client machines that can utilize the computing, storage, network, or graphics processing resources of the compute block. Moreover, any number of compute blocks can be grouped into a "cluster" of compute blocks for greater parallelism and capacity. Although not shown in FIG. 1 for clarity, various power supply modules and associated power and control distribution links can also be included.

Turning now to the components of platform 100, management processor 110 can comprise one or more microprocessors and other processing circuitry that retrieves and executes software, such as user interface 112 and management operating system 111, from an associated storage system. Processor 110 can be implemented within a single processing device but can also be distributed across multiple processing devices or sub-systems that cooperate in executing program instructions. Examples of processor 110 include general purpose central processing units, application specific processors, and logic devices, as well as any other type of processing device, combinations, or variations thereof. In some examples, processor 110 comprises an Intel® or AMD® microprocessor, ARM® microprocessor, FPGA, ASIC, application specific processor, or other microprocessor or processing elements.

In FIG. 1, processor 110 provides interface 113. Interface 113 comprises a communication link between processor 110 and any component coupled to PCIe fabric 151. This interface employs Ethernet traffic transported over a PCIe link. Additionally, each processing module 120 in FIG. 1 is configured with driver 141 which provides for Ethernet communication over PCIe links. Thus, any of processing module 120 and management processor 110 can communicate over Ethernet that is transported over the PCIe fabric. A further discussion of this Ethernet over PCIe configuration is discussed below.

A plurality of processing modules 120 are included in platform 100. Each processing module 120 includes one or more CPUs or microprocessors and other processing circuitry that retrieves and executes software, such as driver 141 and any number of end user applications, from an associated storage system. Each processing module 120 can be implemented within a single processing device but can also be distributed across multiple processing devices or sub-systems that cooperate in executing program instructions. Examples of each processing module 120 include general purpose central processing units, application specific processors, and logic devices, as well as any other type of processing device, combinations, or variations thereof. In some examples, each processing module 120 comprises an Intel® or AMD® microprocessor, ARM® microprocessor, graphics processor, compute cores, graphics cores, application specific integrated circuit (ASIC), or other microprocessor or processing elements. Each processing module 120 can also communicate with other compute units, such as those in a same storage assembly/enclosure or another storage assembly/enclosure over one or more PCIe interfaces and PCIe fabric 151.

A plurality of storage units 130 are included in platform 100. Each storage unit 130 includes one or more storage drives, such as solid state drives in some examples. Each storage unit 130 also includes PCIe interfaces, control processors, and power system elements. Each storage unit 130 also includes an on-sled processor or control system for traffic statistics and status monitoring, among other operations. Each storage unit 130 comprises one or more solid state memory devices with a PCIe interface. In yet other examples, each storage unit 130 comprises one or more separate solid state drives (SSDs) or magnetic hard disk drives (HDDs) along with associated enclosures and circuitry.

Image storage 180 may be included in platform 100. Image storage 180 may include one or more storage drives, such as solid state drives in some examples, or one or more storage units that include one or more storage drives. For example, image storage 180 may comprises one or more solid state memory devices or one or more separate solid state drives (SSDs), magnetic hard disk drives (HDDs), or memory devices, along with associated enclosures and circuitry. Image storage 180 is shown as coupled to the management processors 110 in FIG. 1. In such an embodiment, image storage 180 may be coupled to the management processors 110 using any suitable communication link such as PCIe, NVMe, Ethernet, Serial Attached SCSI (SAS), FibreChannel, Thunderbolt, Serial Attached ATA Express (SATA Express), and the like. In other examples, image storage 180 may be coupled to PCIe fabric 151 as described above for storage units 130.

In some examples, image storage 180 may store one or more software configurations. The software configurations may be disk images or installation data that may be deployed to the storage modules 130 by the management processors 110. In some examples, the software configurations may include operating systems and applications. More particularly, the disk images may include boot images that include operating systems and applications in a form that may be copied to a storage device of the storage modules 130 and then booted from the receiving storage device by a CPU 120. In other examples, image storage 180 may include installation data that may be installed to a storage device of storage modules 130 to and thereby provide a result similar to the deployment of a boot image to that storage device.

A plurality of graphics processing units (GPUs) 170 are included in platform 100. Each GPU comprises a graphics processing resource that can be allocated to one or more compute units. The GPUs can comprise graphics processors, shaders, pixel render elements, frame buffers, texture mappers, graphics cores, graphics pipelines, graphics memory, or other graphics processing and handling elements. In some examples, each GPU 170 comprises a graphics 'card' comprising circuitry that supports a GPU chip. Example GPU cards include nVIDIA® Jetson cards that include graphics processing elements and compute elements, along with various support circuitry, connectors, and other elements. In further examples, other style of graphics processing units or graphics processing assemblies can be employed, such as machine learning processing units, tensor processing units (TPUs), or other specialized processors that may include similar elements as GPUs but lack rendering components to focus processing and memory resources on processing of data.

Network interfaces 140 include network interface cards for communicating over TCP/IP (Transmission Control Protocol (TCP)/Internet Protocol) networks or for carrying user traffic, such as iSCSI (Internet Small Computer System Interface) or NVMe (NVM Express) traffic for storage units 130 or other TCP/IP traffic for processing modules 120. Network interfaces 140 can comprise Ethernet interface equipment, and can communicate over wired, optical, or wireless links. External access to components of platform 100 is provided over packet network links provided by network interfaces 140. Network interfaces 140 communicate with other components of platform 100, such as processing modules 120 and storage units 130 over associated PCIe links and PCIe fabric 151. In some examples, network interfaces are provided for intra-system network communication among for communicating over Ethernet networks for exchanging communications between any of processing modules 120 and management processors 110.

Each PCIe switch 150 communicates over associated PCIe links. In the example in FIG. 1, PCIe switches 150 can be used for carrying user data between network interfaces 140, storage modules 130, and processing modules 120. Each PCIe switch 150 comprises a PCIe cross connect switch for establishing switched connections between any PCIe interfaces handled by each PCIe switch 150. In some examples, each PCIe switch 150 comprises a PLX Technology PEX8725 10-port, 24 lane PCIe switch chip. In other examples, each PCIe switch 150 comprises a PLX Technology PEX8796 24-port, 96 lane PCIe switch chip.

The PCIe switches discussed herein can comprise PCIe crosspoint switches, which logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by processor 110 which logically integrate components into associated compute units 160 of a particular cluster and logically isolate components and compute units among different clusters. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, storage, network) only to have visibility to those components that are included via the segregation/partitioning. Thus, groupings among a plurality of physical components can be achieved using logical partitioning among the PCIe fabric. This partitioning is scalable in nature, and can be dynamically altered as-needed by a management processor or other control elements. The management processor can control PCIe switch circuitry that comprises the PCIe fabric to alter the logical partitioning or segregation among PCIe ports and thus alter composition of groupings of the physical components. These groupings, referred herein as compute units, can individually form "machines" and can be further grouped into clusters of many compute units/machines. Physical components, such as storage drives, processors, or network interfaces, can be added to or removed from compute units according to user instructions received over a user interface, dynamically in response to loading/idle conditions, or preemptively due to anticipated need, among other considerations discussed herein.

As used herein, unless specified otherwise, domain and partition are intended to be interchangeable and may include similar schemes referred to by one of skill in the art as either domain and partition in PCIe and similar network technology. Further, as used herein, unless specified otherwise, segregating and partitioning are intended to be interchangeable and may include similar schemes referred to by one of skill in the art as either segregating and partitioning in PCIe and similar network technology.

PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later (e.g. 4.0, 5.0, and later) might be employed. Moreover, next-generation interfaces can be employed, such as Gen-Z, Cache Coherent Interconnect for Accelerators (CCIX), or Open Coherent Accelerator Processor Interface (OpenCAPI). Also, although PCIe is used in FIG. 1, it should be understood that different communication links or busses can instead be employed, such as NVMe, Ethernet, Serial Attached SCSI (SAS), FibreChannel, Thunderbolt, Serial Attached ATA Express (SATA Express), among other interconnect, network, and link interfaces. NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG.

1 can each be a direct link or might include various equipment, intermediate components, systems, and networks. Any of the links in FIG. 1 can each be a common link, shared link, aggregated link, or may be comprised of discrete, separate links.

In FIG. 1, any processing module 120 has configurable logical visibility to any/all storage units 130, GPU 170 or other physical components of platform 100, as segregated logically by the PCIe fabric. Any processing module 120 can transfer data for storage on any storage unit 130 and retrieve data stored on any storage unit 130. Thus, 'm' number of storage drives can be coupled with 'n' number of processors to allow for a large, scalable architecture with a high-level of redundancy and density. Furthermore, any processing module 120 can transfer data for processing by any GPU 170 or hand off control of any GPU to another processing module 120.

To provide visibility of each processing module 120 to any storage unit 130 or GPU 170, various techniques can be employed. In a first example, management processor 110 establishes a cluster that includes one or more compute units 160. These compute units comprise one or more processing modules 120, zero or more storage units 130, zero or more network interface units 140, and zero or more graphics processing units 170. Elements of these compute units are communicatively coupled by portions of PCIe fabric 151. Once compute units 160 have been assigned to a particular cluster, further resources can be assigned to that cluster, such as storage resources, graphics processing resources, and network interface resources, among other resources. Management processor 110 can instantiate/bind a subset number of the total quantity of storage resources of platform 100 to a particular cluster and for use by one or more compute units 160 of that cluster. For example, 16 storage drives spanning 4 storage units might be assigned to a group of two compute units 160 in a cluster. The compute units 160 assigned to a cluster then handle transactions for that subset of storage units, such as read and write transactions.

Each compute unit 160, specifically each processor of the compute unit, can have memory-mapped or routing-table based visibility to the storage units or graphics units within that cluster, while other units not associated with a cluster are generally not accessible to the compute units until logical visibility is granted. Moreover, each compute unit might only manage a subset of the storage or graphics units for an associated cluster. Storage operations or graphics processing operations might, however, be received over a network interface associated with a first compute unit that are managed by a second compute unit. When a storage operation or graphics processing operation is desired for a resource unit not managed by a first compute unit (i.e. managed by the second compute unit), the first compute unit uses the memory mapped access or routing-table based visibility to direct the operation to the proper resource unit for that transaction, by way of the second compute unit. The transaction can be transferred and transitioned to the appropriate compute unit that manages that resource unit associated with the data of the transaction. For storage operations, the PCIe fabric is used to transfer data between compute units/processors of a cluster so that a particular compute unit/processor can store the data in the storage unit or storage drive that is managed by that particular compute unit/processor, even though the data might be received over a network interface associated with a different compute unit/processor. For graphics processing operations, the PCIe fabric is used to transfer graphics data and graphics processing commands between compute units/processors of a cluster so that a particular compute unit/processor can control the GPU or GPUs that are managed by that particular compute unit/processor, even though the data might be received over a network interface associated with a different compute unit/processor. Thus, while each particular compute unit of a cluster actually manages a subset of the total resource units (such as storage drives in storage units or graphics processors in graphics units), all compute units of a cluster have visibility to, and can initiate transactions to, any of resource units of the cluster. A managing compute unit that manages a particular resource unit can receive re-transferred transactions and any associated data from an initiating compute unit by at least using a memory-mapped address space or routing table to establish which processing module handles storage operations for a particular set of storage units.

In graphics processing examples, NT partitioning or domain-based partitioning in the switched PCIe fabric can be provided by one or more of the PCIe switches with NT ports or domain-based features. This partitioning can ensure that GPUs can be interworked with a desired compute unit and that more than one GPU, such as more than eight (8) GPUs can be associated with a particular compute unit. Moreover, dynamic GPU-compute unit relationships can be adjusted on-the-fly using partitioning across the PCIe fabric. Shared network resources can also be applied across compute units for graphics processing elements. For example, when a first compute processor determines that the first compute processor does not physically manage the graphics unit associated with a received graphics operation, then the first compute processor transfers the graphics operation over the PCIe fabric to another compute processor of the cluster that does manage the graphics unit.

In further examples, memory mapped direct memory access (DMA) conduits can be formed between individual CPU/GPU pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs.

In storage operations, such as a write operation, data can be received over network interfaces 140 of a particular cluster by a particular processor of that cluster. Load balancing or other factors can allow any network interface of that cluster to receive storage operations for any of the processors of that cluster and for any of the storage units of that cluster. For example, the write operation can be a write operation received over a first network interface 140 of a first cluster from an end user employing an iSCSI protocol or NVMe protocol. A first processor of the cluster can receive the write operation and determine if the first processor manages the storage drive or drives associated with the write operation, and if the first processor does, then the first processor transfers the data for storage on the associated storage drives of a storage unit over the PCIe fabric. The individual PCIe switches 150 of the PCIe fabric can be configured to route PCIe traffic associated with the cluster among the various storage, processor, and network elements of the cluster, such as using domain-based routing or NT ports. If the first processor determines that the first processor does not physically manage the storage drive or drives associated with the write operation, then the first processor transfers the write operation to another processor of the cluster that does manage the storage drive or drives over the PCIe fabric. Data striping can be employed by any processor to stripe data for a particular write transaction over any number of storage drives or storage units, such as over one or more of the storage units of the cluster.

In this example, PCIe fabric 151 associated with platform 100 has 64-bit address spaces, which allows an addressable space of $2^{64}$ bytes, leading to at least 16 exbibytes of byte-addressable memory. The 64-bit PCIe address space can shared by all compute units or segregated among various compute units forming clusters for appropriate memory mapping to resource units. The individual PCIe switches 150 of the PCIe fabric can be configured to segregate and route PCIe traffic associated with particular clusters among the various storage, compute, graphics processing, and network elements of the cluster. This segregation and routing can be establishing using domain-based routing or NT ports to establish cross-point connections among the various PCIe switches of the PCIe fabric. Redundancy and failover pathways can also be established so that traffic of the cluster can still be routed among the elements of the cluster when one or more of the PCIe switches fails or becomes unresponsive. In some examples, a mesh configuration is formed by the PCIe switches of the PCIe fabric to ensure redundant routing of PCIe traffic.

Management processor 110 controls the operations of PCIe switches 150 and PCIe fabric 151 over one or more interfaces, which can include inter-integrated circuit (I2C) interfaces that communicatively couple each PCIe switch of the PCIe fabric. Management processor 110 can establish NT-based or domain-based segregation among a PCIe address space using PCIe switches 150. Each PCIe switch can be configured to segregate portions of the PCIe address space to establish cluster-specific partitioning. Various configuration settings of each PCIe switch can be altered by management processor 110 to establish the domains and cluster segregation. In some examples, management processor 110 can include a PCIe interface and communicate/configure the PCIe switches over the PCIe interface or sideband interfaces transported within the PCIe protocol signaling.

Management operating system (OS) 111 is executed by management processor 110 and provides for management of resources of platform 100. The management includes creation, alteration, and monitoring of one or more clusters comprising one or more compute units. Management OS 111 provides for the functionality and operations described herein for management processor 110.

Management processor 110 also includes user interface 112, which can present graphical user interface (GUI) 190 to one or more users. User interface 112 and GUI 190 can be employed by end users or administrators to establish clusters, assign assets (compute units/machines) to each cluster. In FIG. 1, GUI 190 allows end users to create and administer clusters as well as assign one or more machine/compute units to the clusters. GUI 190 provides telemetry information for the operation of system 100 to end users, such as in one or more status interfaces or status views. The state of various components or elements of system 100 can be monitored through GUI 190, such as processor/CPU state, network state, storage unit state, PCIe element state, among others. User interface 112 can provide other user interfaces than GUI 190, such as command line interfaces, application programming interfaces (APIs), or other interfaces. In some examples, GUI 190 is provided over a websockets-based interface.

One or more management processors can be included in a system, such as when each management processor can manage resources for a predetermined number of clusters or compute units. User commands, such as those received over a GUI, can be received into any of the management processors of a system and forwarded by the receiving management processor to the handling management processor. Each management processor can have a unique or pre-assigned identifier which can aid in delivery of user commands to the proper management processor. Additionally, management processors can communicate with each other, such as using a mailbox process or other data exchange technique. This communication can occur over dedicated sideband interfaces, such as I2C interfaces, or can occur over PCIe or Ethernet interfaces that couple each management processor.

Management OS 111 also includes emulated network interface 113. Emulated network interface 113 comprises a transport mechanism for transporting network traffic over one or more PCIe interfaces. Emulated network interface 113 can emulate a network device, such as an Ethernet device, to management processor 110 so that management processor 110 can interact/interface with any of processing modules 120 over a PCIe interface as if the processor was communicating over a network interface. Emulated network interface 113 can comprise a kernel-level element or module which allows management OS 111 to interface using Ethernet-style commands and drivers. Emulated network interface 113 allows applications or OS-level processes to communicate with the emulated network device without having associated latency and processing overhead associated with a network stack. Emulated network interface 113 comprises a software component, such as a driver, module, kernel-level module, or other software component that appears as a network device to the application-level and system-level software executed by the processor device.

In the examples herein, network interface 113 advantageously does not require network stack processing to transfer communications. Instead, emulated network interface 113 transfers communications as associated traffic over a PCIe interface or PCIe fabric to another emulated network device. Emulated network interface 113 does not employ network stack processing yet still appears as network device to the operating system of an associated processor, so that user software or operating system elements of the associated processor can interact with network interface 113 and communicate over a PCIe fabric using existing network-facing communication methods, such as Ethernet communications.

Emulated network interface 113 translates PCIe traffic into network device traffic and vice versa. Processing communications transferred to the network device over a network stack is omitted, where the network stack would typically be employed for the type of network device/interface presented. For example, the network device might be presented as an Ethernet device to the operating system or applications. Communications received from the operating system or applications are to be transferred by the network device to one or more destinations. However, emulated network interface 113 does not include a network stack to process the communications down from an application layer down to a link layer. Instead, emulated network interface 113 extracts the payload data and destination from the communications received from the operating system or applications and translates the payload data and destination into PCIe traffic, such as by encapsulating the payload data into PCIe frames using addressing associated with the destination.

Management driver 141 is included on each processing module 120. Management driver 141 can include emulated network interfaces, such as discussed for emulated network interface 113. Additionally, management driver 141 monitors operation of the associated processing module 120 and software executed by a CPU of processing module 120 and provides telemetry for this operation to management processor 110. Thus, any user provided software can be executed by CPUs of processing modules 120, such as user-provided operating systems (Windows, Linux, MacOS, Android, iOS, etc. . . . ) or user application software and drivers. Management driver 141 provides functionality to allow each processing module 120 to participate in the associated compute unit and/or cluster, as well as provide telemetry data to an associated management processor. Each processing module 120 can also communicate with each other over an emulated network device that transports the network traffic over the PCIe fabric. Driver 141 also provides an API for user software and operating systems to interact with driver 141 as well as exchange control/telemetry signaling with management processor 110.

Figure 2:
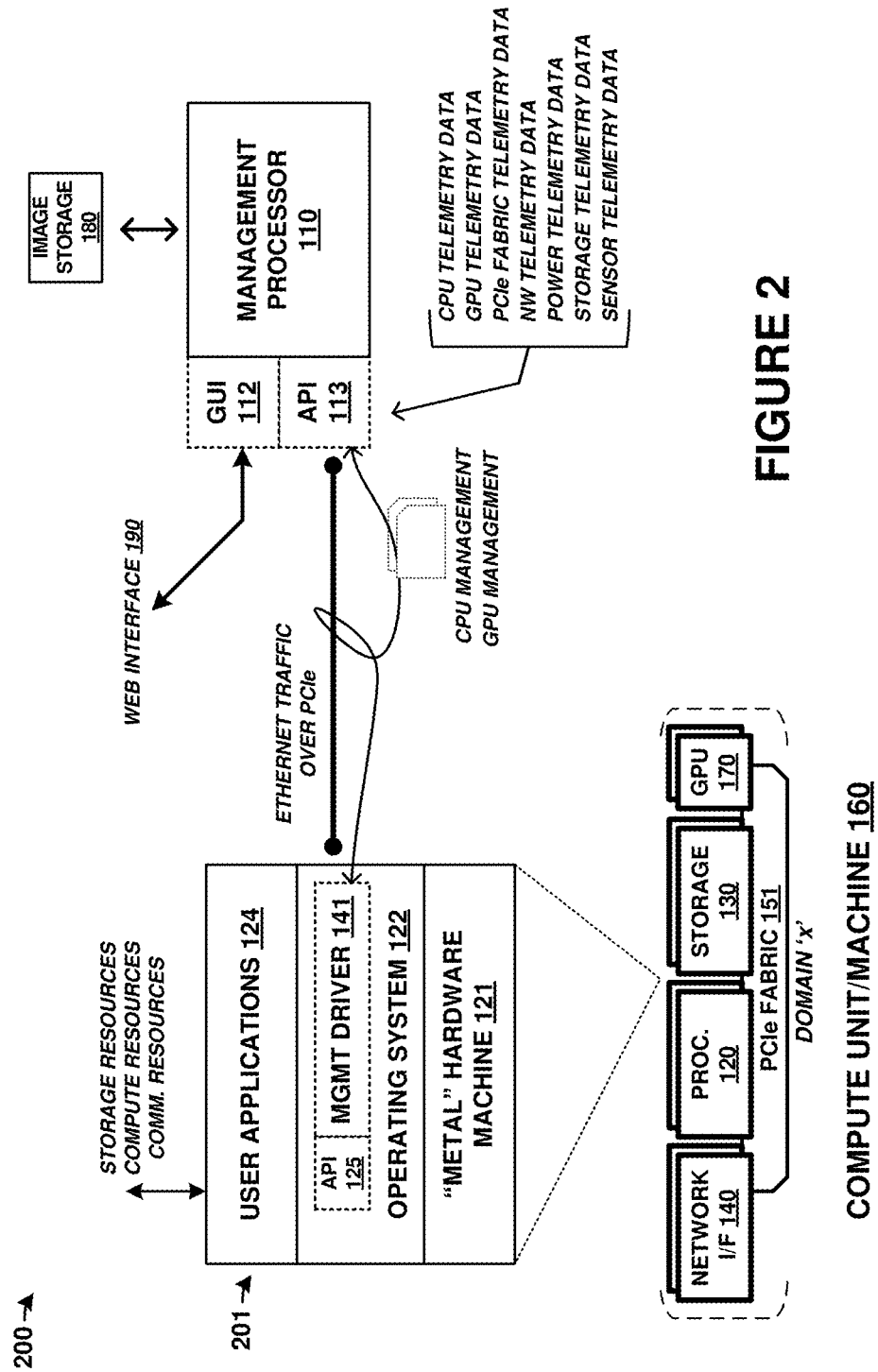
FIG. 2 is a diagram illustrating management of a computing platform in an implementation.

FIG. 2 is a system diagram that includes further details on elements from FIG. 1. System 200 includes a detailed view of an implementation of processing module 120 as well as management processor 110.

In FIG. 2, processing module 120 can be an exemplary processor in any compute unit or machine of a cluster. Detailed view 201 shows several layers of processing module 120. A first layer 121 is the hardware layer or "metal" machine infrastructure of processor processing module 120. A second layer 122 provides the OS as well as management driver 141 and API 125. Finally, a third layer 124 provides user-level applications. View 201 shows that user applications can access storage, processing (CPU or GPU), and communication resources of the cluster, such as when the user application comprises a clustered storage system or a clustered processing system.

As discussed above, driver 141 provides an emulated network device for communicating over a PCIe fabric with management processor 110 (or other processor elements). This is shown in FIG. 2 as Ethernet traffic transported over PCIe. However, a network stack is not employed in driver 141 to transport the traffic over PCIe. Instead, driver 141 appears as a network device to an operating system or kernel to each processing module 120. User-level services/applications/software can interact with the emulated network device without modifications from a normal or physical network device. However, the traffic associated with the emulated network device is transported over a PCIe link or PCIe fabric, as shown. API 113 can provide a standardized interface for the management traffic, such as for control instructions, control responses, telemetry data, status information, or other data.

Figure 3:
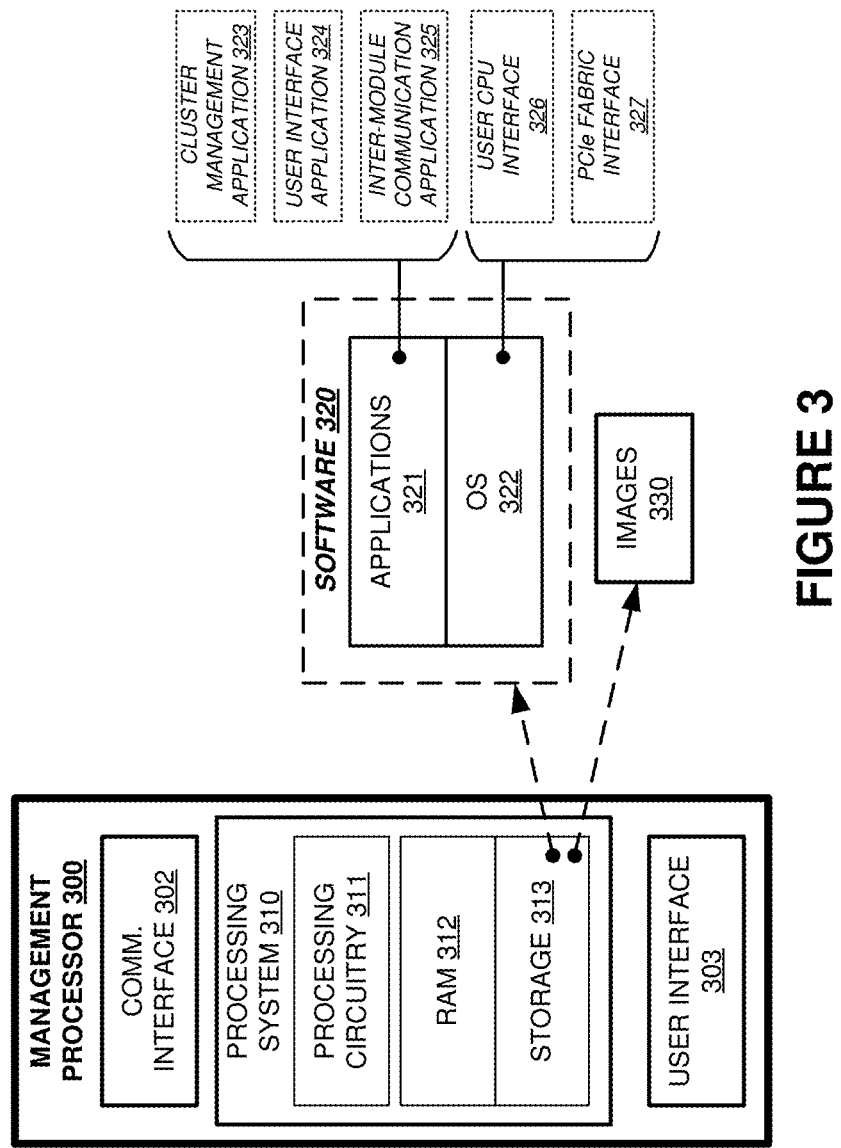
FIG. 3 is a block diagram illustrating a management processor in an implementation.

FIG. 3 is s block diagram illustrating management processor 300. Management processor 300 illustrates an example of any of the management processors discussed herein, such as processor 110 of FIG. 1. Management processor 300 includes communication interface 302, user interface 303, and processing system 310. Processing system 310 includes processing circuitry 311, random access memory (RAM) 312, and storage 313, although further elements can be included.

Processing circuitry 311 can be implemented within a single processing device but can also be distributed across multiple processing devices or sub-systems that cooperate in executing program instructions. Examples of processing circuitry 311 include general purpose central processing units, microprocessors, application specific processors, and logic devices, as well as any other type of processing device. In some examples, processing circuitry 311 includes physically distributed processing devices, such as cloud computing systems.

Communication interface 302 includes one or more communication and network interfaces for communicating over communication links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interface 302 can include network interfaces configured to communicate using one or more network addresses, which can be associated with different network links. Examples of communication interface 302 include network interface card equipment, transceivers, modems, and other communication circuitry.

User interface 303 may include a touchscreen, keyboard, mouse, voice input device, audio input device, or other touch input device for receiving input from a user. Output devices such as a display, speakers, web interfaces, terminal interfaces, and other types of output devices may also be included in user interface 303. User interface 303 can provide output and receive input over a network interface, such as communication interface 302. In network examples, user interface 303 might packetize display or graphics data for remote display by a display system or computing system coupled over one or more network interfaces. Physical or logical elements of user interface 303 can provide alerts or visual outputs to users or other operators. User interface 303 may also include associated user interface software executable by processing system 310 in support of the various user input and output devices discussed above. Separately or in conjunction with each other and other hardware and software elements, the user interface software and user interface devices may support a graphical user interface, a natural user interface, or any other type of user interface.

RAM 312 and storage 313 together can comprise a non-transitory data storage system, although variations are possible. RAM 312 and storage 313 can each comprise any storage media readable by processing circuitry 311 and capable of storing software and OS images. RAM 312 can include volatile and nonvolatile, removable and non-removable media implemented in any method or technology for storage of information, such as computer readable instructions, data structures, program modules, or other data. Storage 313 can include non-volatile storage media, such as solid state storage media, flash memory, phase change memory, or magnetic memory, including combinations thereof. RAM 312 and storage 313 can each be implemented as a single storage device but can also be implemented across multiple storage devices or sub-systems. RAM 312 and storage 313 can each comprise additional elements, such as controllers, capable of communicating with processing circuitry 311.

Software stored on or in RAM 312 or storage 313 can comprise computer program instructions, firmware, or some other form of machine-readable processing instructions having processes that when executed a processing system direct processor 300 to operate as described herein. For example, software 320 can drive processor 300 to receive user commands to establish clusters comprising compute blocks among a plurality of physical computing components that include processing modules, storage modules, and network modules. In some examples, software 320 can drive processor 300 to deploy data from images 330 to be utilized in a compute unit (e.g. as a disk image or by performing an installation process). This data can comprise operating system images, pre-installed applications, bootable software images, ISO files, containers, Dockers, virtual nodes, or other data to a storage device. Software 320 can drive processor 300 to receive and monitor telemetry data, statistical information, operational data, and other data to provide telemetry to users and alter operation of clusters according to the telemetry data or other data. Software 320 can drive processor 300 to manage cluster and compute/graphics unit resources, establish domain partitioning or NT partitioning among PCIe fabric elements, and interface with individual PCIe switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

System software 320 illustrates a detailed view of an example configuration of RAM 312. It should be understood that different configurations are possible. System software 320 includes applications 321 and operating system (OS) 322. Software applications 323-326 each comprise executable instructions which can be executed by processor 300 for operating a cluster controller or other circuitry according to the operations discussed herein.

Specifically, cluster management application 323 establishes and maintains clusters and compute units among various hardware elements of a computing platform, such as seen in FIG. 1. User interface application 324 provides one or more graphical or other user interfaces for end users to administer associated clusters and compute units and monitor operations of the clusters and compute units. Inter-module communication application 325 provides communication among other processor 300 elements, such as over I2C, Ethernet, emulated network devices, or PCIe interfaces. User CPU interface 327 provides communication, APIs, and emulated network devices for communicating with processors of compute units, and specialized driver elements thereof. PCIe fabric interface 328 establishes various logical partitioning or domains among PCIe switch elements, controls operation of PCIe switch elements, and receives telemetry from PCIe switch elements.

Software 320 can reside in RAM 312 during execution and operation of processor 300, and can reside in storage system 313 during a powered-off state, among other locations and states. Software 320 can be loaded into RAM 312 during a startup or boot procedure as described for computer operating systems and applications. Software 320 can receive user input through user interface 303. This user input can include user commands, as well as other input, including combinations thereof.

Storage system 313 can comprise flash memory such as NAND flash or NOR flash memory, phase change memory, magnetic memory, among other solid state storage technologies. As shown in FIG. 3, storage system 313 includes software 320. As described above, software 320 can be in a non-volatile storage space for applications and OS during a powered-down state of processor 300, among other operating software.

Processor 300 is generally intended to represent a computing system with which at least software 320 is deployed and executed in order to render or otherwise implement the operations described herein. However, processor 300 can also represent any computing system on which at least software 320 can be staged and from where software 320 can be distributed, transported, downloaded, or otherwise provided to yet another computing system for deployment and execution, or yet additional distribution.

The systems and operations discussed herein provide for dynamic assignment of computing resources, graphics processing resources, network resources, or storage resources to a computing cluster. The computing units are disaggregated from any particular cluster or computing unit until allocated by users of the system. Management processors can control the operations of the cluster and provide user interfaces to the cluster management service provided by software executed by the management processors. A cluster includes at least one "machine" or computing unit, while a computing unit include at least a processor element. Computing units can also include network interface elements, graphics processing elements, and storage elements, but these elements are not required for a computing unit.

Processing resources and other elements (graphics processing, network, storage) can be swapped in and out of computing units and associated clusters on-the-fly, and these resources can be assigned to other computing units or clusters. In one example, graphics processing resources can be dispatched/orchestrated by a first computing resource/CPU and subsequently provide graphics processing status/results to another compute unit/CPU. In another example, when resources experience failures, hangs, overloaded conditions, then additional resources can be introduced into the computing units and clusters to supplement the resources.

Processing resources can have unique identifiers assigned thereto for use in identification by the management processor and for identification on the PCIe fabric. User supplied software such as operating systems and applications can be deployed to processing resources as-needed when the processing resources are initialized after adding into a compute unit, and the user supplied software can be removed from a processing resource when that resource is removed from a compute unit. The user software can be deployed from a storage system that the management processor can access for the deployment. Storage resources, such as storage drives, storage devices, and other storage resources, can be allocated and subdivided among compute units/clusters. These storage resources can span different or similar storage drives or devices, and can have any number of logical units (LUNs), logical targets, partitions, or other logical arrangements. These logical arrangements can include one or more LUNs, iSCSI LUNs, NVMe targets, or other logical partitioning. Arrays of the storage resources can be employed, such as mirrored, striped, redundant array of independent disk (RAID) arrays, or other array configurations can be employed across the storage resources. Network resources, such as network interface cards, can be shared among the compute units of a cluster using bridging or spanning techniques. Graphics resources, such as GPUs, can be shared among more than one compute unit of a cluster using NT partitioning or domain-based partitioning over the PCIe fabric and PCIe switches.

Figure 4:
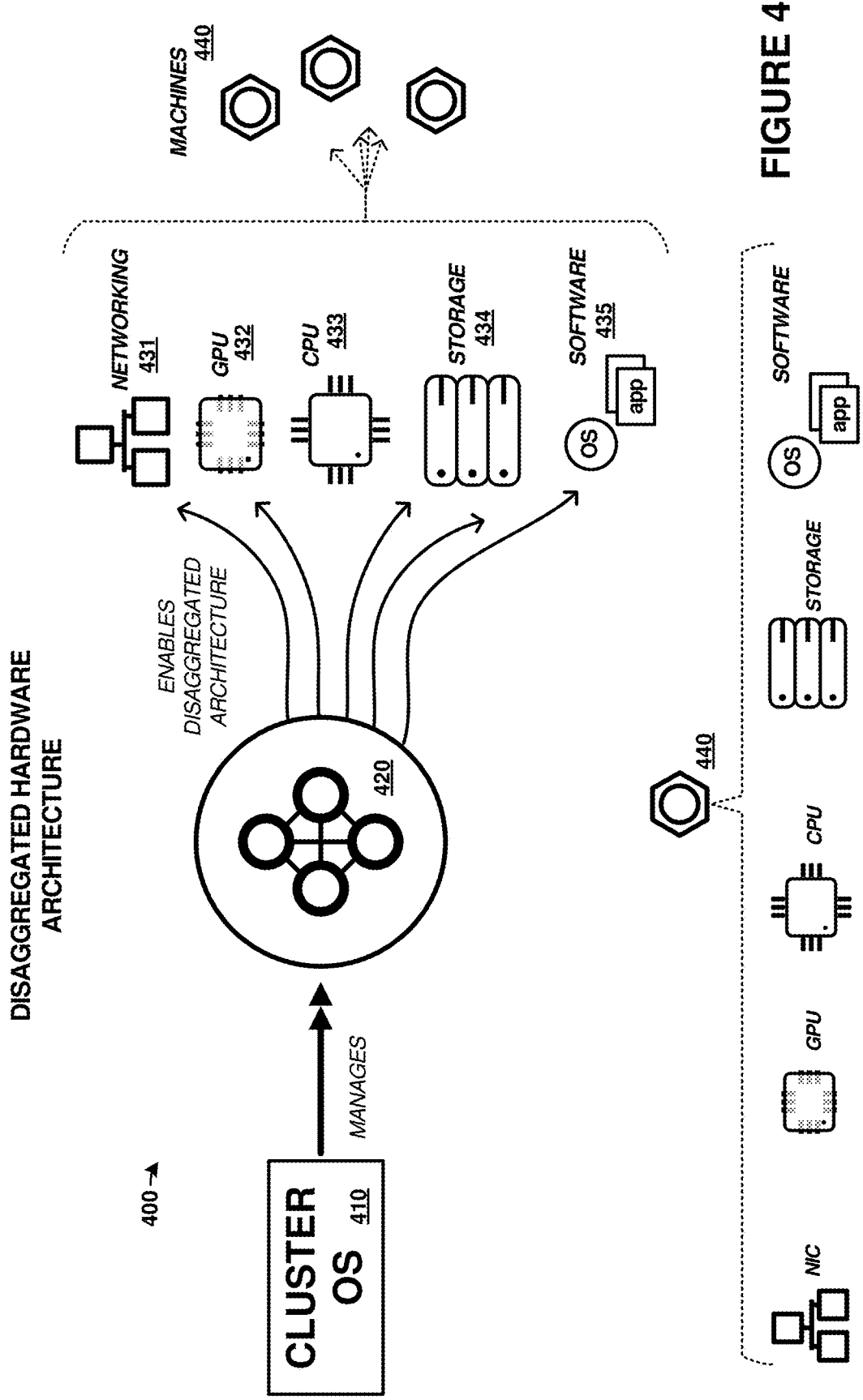
FIG. 4 illustrates example cluster management implementations.
Figure 5:
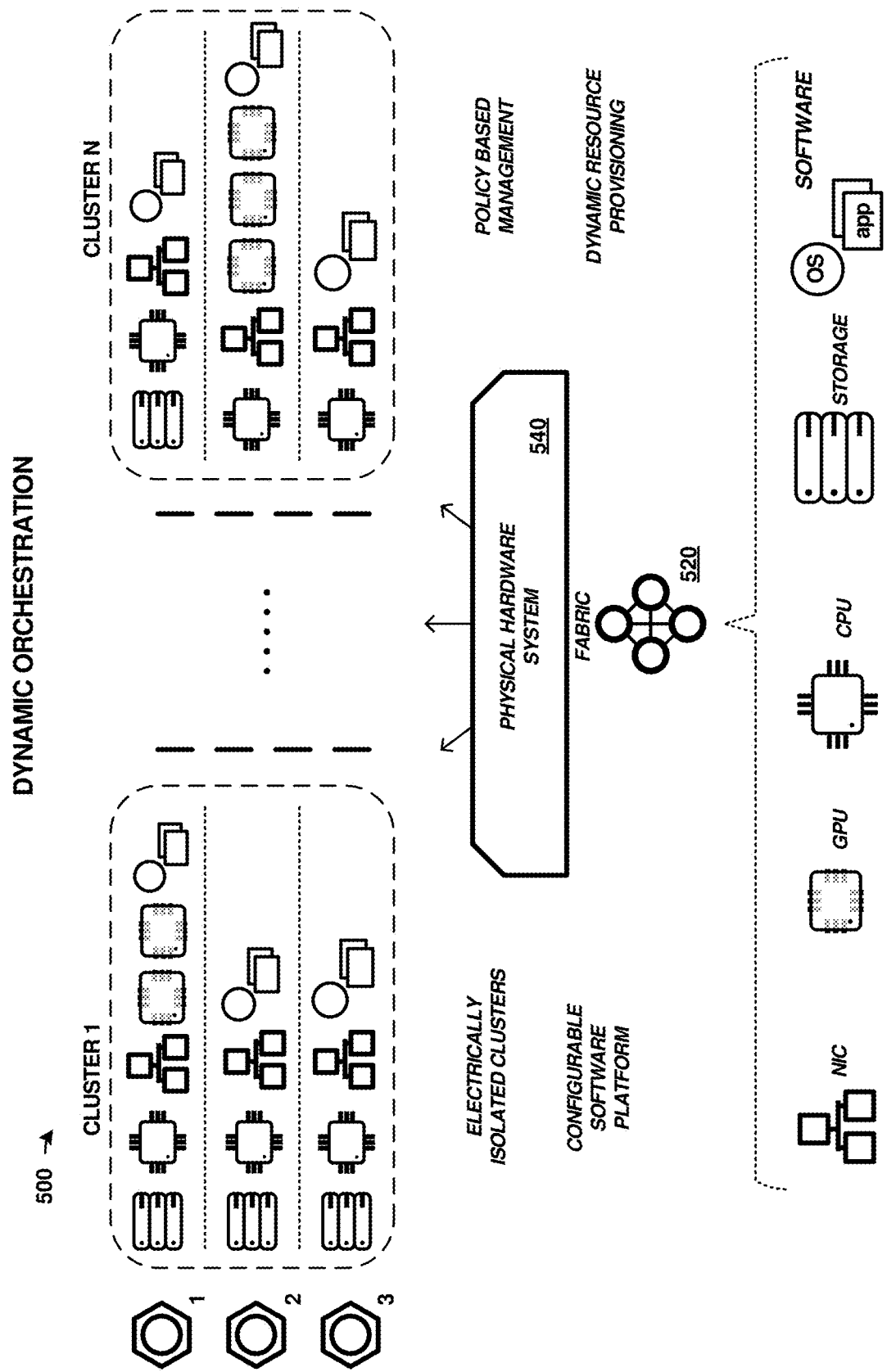
FIG. 5 illustrates example cluster management implementations.

FIGS. 4 and 5 include further detail on a disaggregated computing architecture, such as discussed herein in FIG. 1 for computing platform 100. More particularly, FIGS. 4 and 5 detail example configurations and methods of operating a disaggregated computing architecture. These examples include operating compute units in a clustered environment. The clusters can be formed using one or more compute units that each include a plurality of physical computing components communicatively coupled over a Peripheral Component Interconnect Express (PCIe) fabric.

The physical computing components include at least central processing units (CPUs), storage modules, graphics processing modules (GPUs), and network interface modules. These physical computing components are all communicatively coupled over a PCIe fabric. The PCIe fabric can isolate the compute units from each other or within clusters in the clustered environment using logical partitioning within the PCIe fabric. Moreover, software components can be deployed by a management processor to at least an associated CPU within each of the compute units responsive to formation of the compute units. Various monitoring functions can be included in the deployed software components, and telemetry can be reported to the management processor related to operation of the compute units.

In some examples, a network driver function of the software component is included that emulates operation of a network interface, such as an Ethernet interface, to an operating system of an associated CPU of a compute unit for transfer of communications comprising at least the telemetry to the management processor over the PCIe fabric. The network driver function can include functionality for transferring communications over the PCIe fabric for delivery to the management processor without processing the communications through a network stack.

Based at least on the logical partitioning of the PCIe fabric, the compute units have visibility over the PCIe fabric to only a subset of the plurality of physical computing components assigned to each of the compute units within the PCIe fabric. Each particular compute unit lacks visibility over the PCIe fabric to other physical computing components that are communicatively coupled over the PCIe fabric and not assigned to the particular compute unit. However, the logical partitioning can also be configured to form clusters of compute units, where the compute units of the cluster can have visibility to other compute units of the cluster over the PCIe fabric, but be partitioned from having visibility to compute units not of the cluster. Typically, a management processor is configured to instruct the PCIe fabric to establish the logical partitioning within the PCIe fabric by at least forming domain-based PCIe segregation among ports of PCIe switches that comprise the PCIe fabric. However, the management processor can be configured to instruct the PCIe fabric to establish the logical partitioning within the PCIe fabric by at least forming non-transparent (NT) port-based PCIe segregation among ports of PCIe switches that comprise the PCIe fabric.

Dynamic alterations to the composition of the compute units and compute clusters can also be achieved. These dynamic alterations can be responsive to user instructions, graphical user interface indications received from users, or by automated processes that detect performance of the compute units and compute clusters. For example, responsive to alteration of the logical partitioning by the management processor, the disaggregated platform changes a composition of the plurality of physical computing components within a compute unit. The composition of the plurality of physical computing components within a compute unit can be altered to include at least one more CPU, GPU, storage module, and network interface module. The composition of the plurality of physical computing components within a compute unit can be altered to reduce a quantity of a CPU, GPU, storage module, and network interface module included in the compute unit.

Moreover, clusters can be altered to increase or decrease the number of compute units included therein, such as to increase processing power of a cluster by adding more compute units on-the-fly. Thus, both compute units and clusters can be managed dynamically for enhanced responsiveness to workload, user requirements, scheduling, and other considerations. Since the physical computing components are all coupled via a flexible and configurable PCIe fabric, the physical computing components can be spun-up and spun-down as-needed and in response to various conditions and requirements. In a specific example, a compute unit might not initially be formed with a GPU, but later requirements or workload changes might warrant inclusion of a GPU or more than one GPU into the compute unit. The PCIe fabric partitioning can be altered on-the-fly to allow one or more GPUs to be associated with the CPU or CPUs of the particular compute unit.

FIG. 4 illustrates a disaggregated infrastructure 400 highlighting cluster management operating system (OS) 410 executed by a management processor and control of PCIe fabric 420. The management OS provides for the management, automation, and orchestration of storage, compute, GPU, and network elements on PCIe-based fabrics. For example, storage elements 434, central processing elements (CPU) 433, graphics processing elements (GPU) 432, and network interface card (NIC) elements 431 are all able to be communicatively coupled over PCIe fabric 420. The PCIe fabric enables the disaggregated architecture by providing a partition-able communication medium for coupling the various elements into compute units and grouping the compute units into clusters.

To provide the disaggregated architecture, FIG. 4 illustrates a pool of free elements (431-434) that have not yet been assigned to a particular "machine" 440 or compute unit and operating systems and applications 435 present on the free pool of elements (431-434) or that may be deployed to storage devices for use in machines 440. The free elements are physically present in the associated system but remain idle or unassigned to a particular cluster/machine/compute unit. The management OS can select among the free elements and assign selected ones of the free elements to a machine. Requirements for the machine, such as what tasks the machine is being employed for, can be processed by the management OS to aid in selection of proper elements among the free compute, GPU, network, and storage elements. Users can interface with graphical or command-line interfaces that allow definition or indication of the requirements or other user targets.

The management OS can select among the free elements in response to the user requests. In some examples, the management OS may deploy software 435 to storage devices to be used in a machine 440. In some examples, the management OS may respond user instructions that specify a particular software 435 to deploy to a storage device. In other examples, the user instructions may include one or more fields that identify characteristics for software 435 to be deployed and the management OS may be configured to select software 435 that matches the identified characteristics. Further, in some examples, the user instructions may specify the storage device to receive software 435 while, in other examples, the management OS may select the storage device, for example, based on user specifications. In addition, where the management OS selects software 435 and storage device, the management OS may determine whether a free pool storage device already includes software 435 such that the free pool storage device may be allocated to machine 440 without deployment operations.

As mentioned above, the management OS may operate to select software 435 and free pool elements based on characteristics specified by the user. In such examples, the management OS can learn to recognize various requests for elements and select suitable elements from the free pool. For example, the management OS can recognize particular user-provided operating systems or user-provided applications that run on a cluster, and select certain free elements to include in one or more machines based on that recognition. In one example, the operating system to be executed by a particular machine might be specified by a user to be a Linux operating system. Particular elements can be selected from the free pool to enable the machine to run the Linux operating system. User applications, operating systems, storage requirements, interface or traffic requirements, or other considerations can be used to select elements to include in each machine.

FIG. 5 illustrates clustered operation during dynamic "bare metal" orchestration. Several machines are shown for each cluster, with associated machines comprised of physical elements/resources 540 such as CPUs, GPUs, NICs, and storage drives and software deployed thereto. The clusters are electrically isolated using PCIe fabric 520, and a management system can dynamically pull elements/resources from a pool of free elements, such as seen in FIG. 4. Thus, one or more physical enclosures, such as a rack-mounted hardware arrangement, can have many elements (i.e. several processors, network interfaces, GPUs, and storage drives) and these elements can be allocated dynamically among any number of clusters and associated compute units/machines.

FIG. 5 illustrates example clusters, 1-N, with any number of clusters possible depending upon the availability of resources to be assigned to machines of the clusters. Although each cluster is shown to have three machines, it should be understood that more or less than three machines per cluster can be utilized. Moreover, each machine in each cluster indicates example elements assigned thereto. These assigned elements can change dynamically according to policy based management, user commands, user instructions, preemptive or predictive allocation, idle/spin-down based removal, or other considerations. One or more management services or control processors can be configured to perform this establishment and alteration of machines and clusters using the PCIe fabric as a medium to couple the various elements dynamically.

Figure 6:
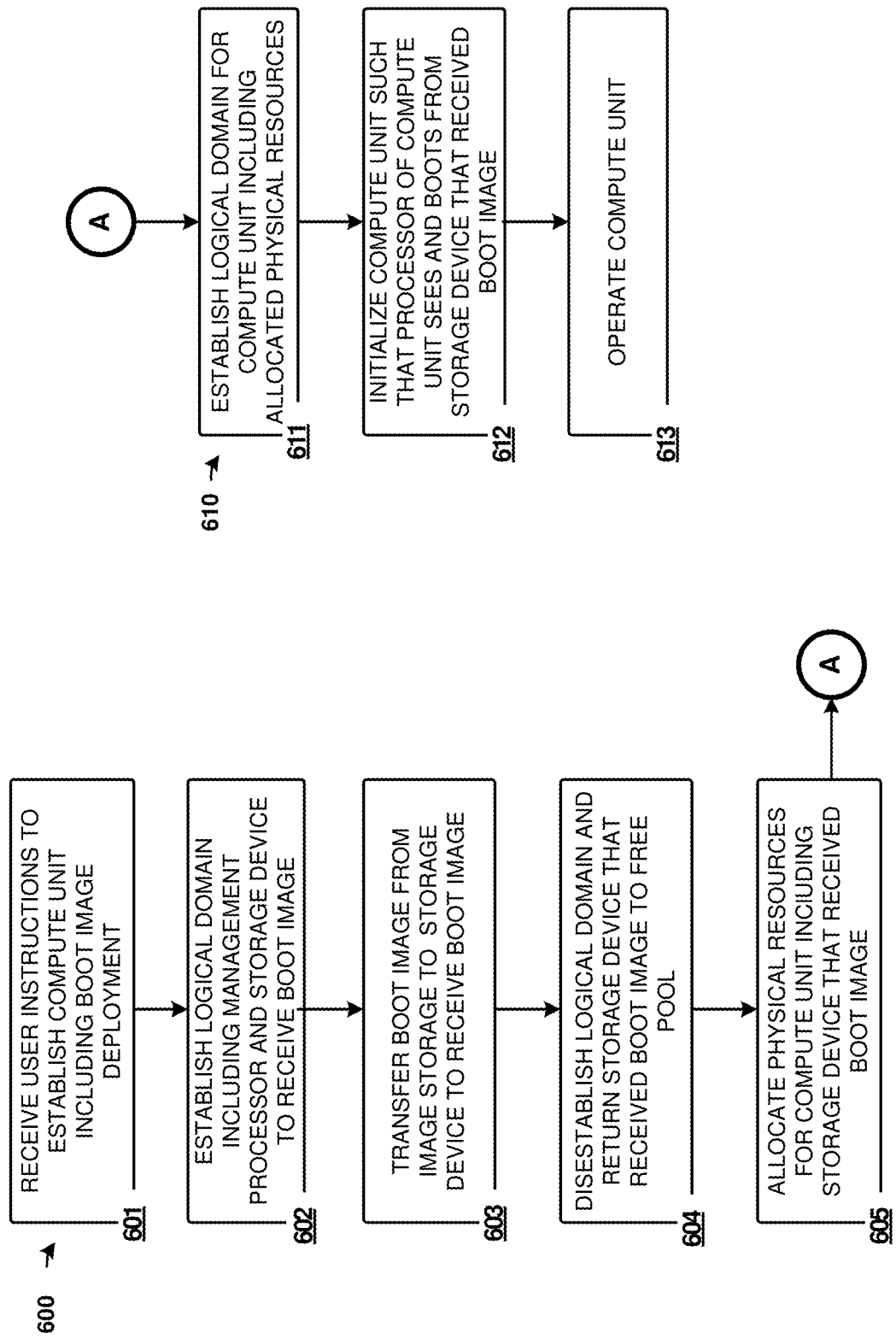
FIG. 6 is a diagram illustrating components of a computing platform in an implementation.
Figure 7:
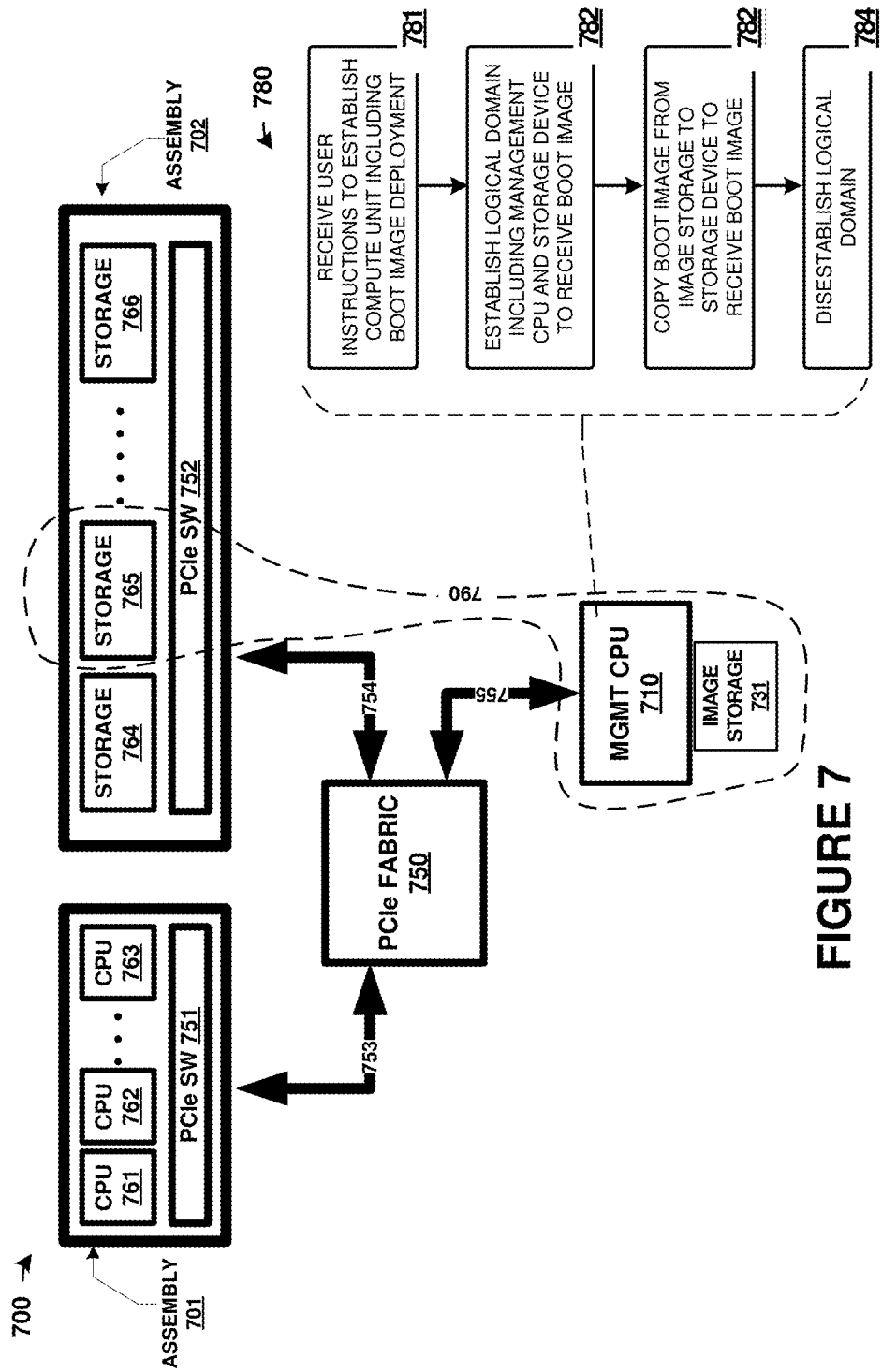
FIG. 7 is a diagram illustrating components of a computing platform in an implementation.
Figure 8:
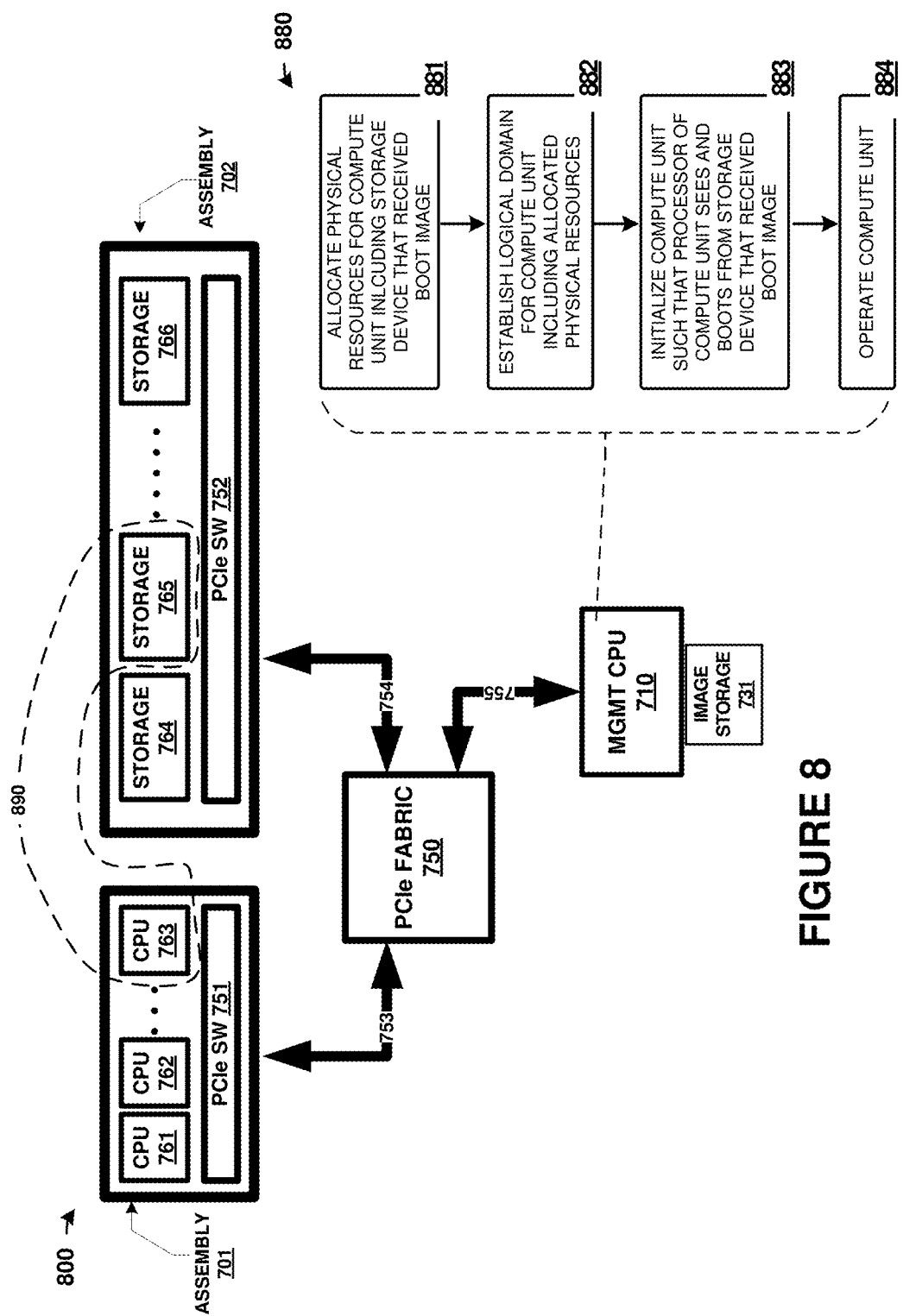
FIG. 8 is a diagram illustrating components of a computing platform in an implementation.

As previously discussed, in some examples, the computing platform may provide for boot image or boot data deployment in establishing computing units. Such operations are discussed herein with reference to FIGS. 6-8. FIG. 6 provides a flow diagram for use in the platforms and systems which may provide for boot image or boot data deployment in establishing computing units. FIGS. 7-8 illustrate the operation of the flow diagram of FIG. 6 in the context of a platform.

FIG. 6 includes a flow diagram that illustrates an operational example of boot image deployment in establishing compute units for any of the systems discussed herein, such as for platform 100 of FIG. 1, system 200 of FIG. 2, or processor 300 of FIG. 3. In FIG. 6, operations will be discussed in context of elements of FIGS. 1 and 2, although the operations can also apply to those in FIG. 3.

Management processor 110 may receive (601) user instructions to establish a compute unit including instructions to deploy a boot image to a storage device to be utilized in the compute unit. For example, the user instructions may be received via a user interface as part of user instructions to establish a cluster or may be received in instructions to establish a specific compute unit. In some examples, the user instructions may specify the boot image to deploy by using a pre-established identifier for the boot image to be deployed. In other examples, the user instructions may include one or more fields that identify characteristics for the boot image to be deployed and the management processor may be configured to select a boot image that matches the identified characteristics. Further, in some examples, the user instructions may specify the storage device to receive the boot image while, in other examples, the management processor may select the storage device, for example based on user specifications.

Upon receiving the user instructions to establish the compute unit including instructions to deploy the boot image, management processor 110 may establish (602) a logical PCIe domain that includes management processor 110 and a target storage device to receive boot image. In some examples, management processor 110 is communicatively coupled to one or more image storage devices, such as image storage 180 or storage 313. In further examples, the logical domain may further include the image storage device if, for example, management processor 110 accesses image storage devices via PCIe communications. Various examples for establishing logical domains in PCIe and similar communication systems are discussed above. Referring to previous examples, this may operate to remove the storage device from the free pool of devices. Establishing a logical PCIe domain may provide visibility between the management processor and the storage device so that the management processor can instantiate the storage device on a PCIe interface local to the management processor. In some examples, the management processor may be the only root device visible to the storage device in the logical domain, where the storage device is an endpoint device in the logical domain.

Management processor 110 may then transfer (603) the boot image from the image storage device to the target storage device desired to receive the boot image. In some examples, the boot image may be disk image that includes the contents and structure of a disk volume or of an entire data storage device. This boot image can comprise operating systems, pre-installed applications, bootable software images, ISO files, containers, Dockers, virtual nodes, or other data to a storage device. The contents of the disk image may include an operating system and other applications for operating the compute unit in a state which may be used for booting the stored operating system. In other examples, the management processor may perform an installation and setup process to the target storage device, for example, to install an operating system and other applications to the target storage device.

Management processor 110 may then terminate (604) the logical domain by at least de-establishing the logical domain between management processor 110 and the target storage device. In some examples, management processor 110 may also return the target storage device that received boot image to the free pool. In other examples, the management processor may not return the storage device to the free pool but change the assignment of the storage device to a target compute unit directly.

Management processor 110 may allocate (605) physical resources for a target compute unit including the target storage device that received the boot image and, for example, a CPU and other physical components for the compute unit. As with the storage device that received the boot image, depending on the example, the CPU and other physical components for the compute unit may be directly identified by the user instructions, selected by the management processor based on the user instructions, selected by the management processor without reference to the user instructions and so on.

At operation 611, the management processor may establish a logical PCIe domain for the allocated physical resources of the compute unit including the target storage device that received the boot image. In some examples, the establishing of the logical domain may provide visibility between the allocated processor and the target storage device that received the boot image. In some examples, the allocated processor may be the only root device visible to the storage device in the logical domain, while the target storage device is an endpoint or non-host on the logical domain. The management processor may then initialize (612) the compute unit such that the allocated processor of compute unit sees and boots from the target storage device that received boot image. The compute unit may then operate (613) using the booted OS or other software and data from the target storage device.

Many variations of the above process can be achieved. For example, while the example process discussed above operates based on user instructions to establish a compute unit or cluster including instructions to deploy a boot image to a target storage device, other examples may determine whether a target storage device is available that has an indicated boot image or software characteristics already deployed thereon. If so, the management processor may utilize the already configured target storage device or, if not, perform a deployment operation such as that discussed above. Additionally, while the example above discusses boot image and boot data deployment, in other examples, the software configurations deployed may not be boot images or boot data. Instead, the procedure discussed above may be utilized to deploy any data to storage devices. Further, the procedure discussed above may also be applied to deploying data to a target storage device that is then dynamically added to an already initialized and booted compute unit.

FIGS. 7-8 illustrate the operation of process discussed above with regard to FIG. 6 in the context of a computing platform 700. For sake of brevity, the entire discussion of the process of FIG. 6 will not be repeated and the discussion of FIG. 6 may be used for additional details for the operations discussed with regard to FIGS. 7 and 8.

FIG. 7 is presented to illustrate an example of the operation of the process discussed above with regard to FIG. 6 in the context of a computing platform. In FIG. 7, computing platform 700 is presented and performs operations 780. Computing platform 700 includes a management CPU 710 with an attached image storage device 731, PCIe fabric 750, as well assemblies 701-702 that house a plurality associated CPUs 761-763 and a plurality of storage devices 764-766 as well as a corresponding PCIe switch 751-752, respectively. Assemblies 701-702 might comprise any chassis, rackmount or "just a box of disks" (JBOD) assemblies. A number of PCIe links interconnect the elements of FIG. 7, namely PCIe links 753-755. In some examples, PCIe link 755 may comprise a special control/management link that enables administrative or management-level access of control to PCIe fabric 750. However, it should be understood that similar links to the other PCIe links can instead be employed. In addition, while shown as attached to the management CPU 710, the image storage device 731 may instead be coupled the PCIe fabric 750 instead of the management CPU 710 in other examples.

In operation 781, the management CPU 710 may receive user instructions to establish a compute unit including instructions to deploy a boot image to a storage device to be utilized in the compute unit. In some examples, the user instructions may specify the boot image to deploy and a storage device to receive the boot image. In other examples, the management CPU 710 may determine a boot image and storage device, for example, based on the user instructions. In the illustrated example, the storage device to receive the boot image deployment is storage device 765.

In operation 782, the management CPU 710 may establish a logical domain 790 that includes the management CPU 710 and the storage device 765. In some examples, establishing the logical domain 790 may provide visibility between the management CPU 710 and the storage device 765 over the PCIe fabric. In some example, the logical domain may further include the image storage device 731, for example, if the management CPU 710 accesses the image storage device 731 via PCIe communications.

In operation 783, the management CPU 710 may copy the boot image from the image storage device 731 to the storage device 765. Once the boot image has been copied, in operation 784, the management CPU 710 may de-establish the logical domain 790. In some examples, this may return the storage device 765 to the free pool. In other examples, the management CPU 710 may not reassign the storage device 765 to the free pool but change the assignment of the storage device 765 to the compute unit directly. The operations 780 of computing platform 700 continue in FIG. 8 with operations 880.

FIG. 8 is presented to illustrate an example of the operation of the process discussed above with regard to FIG. 6 in the context of a computing platform. As previously mentioned, in FIG. 8, computing platform 700 is presented and performs operations 880, which follow operation 784 of FIG. 7.

In operation 881, the management CPU 710 may allocate physical resources for the compute unit including storage device 765 and, in this example, CPU 763. As with the storage device 765, depending on the example platform, the CPU 763 and other physical components for the compute unit (not shown in this example) may be directly identified by the user instructions, selected by the management CPU 710 based on the user instructions, selected by the management CPU 710 without reference to the user instructions and so on.

In operation 882, the management CPU 710 may establish a logical domain 890 for the allocated physical resources of the compute unit including storage device 765 and the CPU 763. In operation 883, the management CPU 710 may initialize the compute unit such that the CPU 763 sees and boots from storage device 765 using the deployed boot image. The compute unit including CPU 763 and storage device 765 may then operate using the booted OS in operation 884.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. An apparatus comprising:
one or more computer readable storage media;
a processor operatively coupled with the one or more computer readable storage media; and
program instructions stored on the one or more computer readable storage media, that when executed by the processor, direct the processor to at least:
present a user interface configured to receive instructions related to deployment of software to compute units;
receive user selections of a software element for deployment to a compute unit comprising a processing element and a storage element;
responsive to the user selections, instruct a management processor of a communication fabric to deploy the software element for use by the compute unit by at least establishing a first partitioning in the communication fabric between the management processor and the storage element, deploying the software element to the storage element using the first partitioning, de-establishing the first partitioning, and establishing a second partitioning in the communication fabric between the processing element and the storage element comprising the software element, wherein the processing element operates using the software element.

2. The apparatus of claim 1, wherein the processing element boots with a boot image comprising the software element from the storage element over the second partitioning.

3. The apparatus of claim 2, wherein the software element further comprises one or more user applications configured to be executed by the processing element.

4. The apparatus of claim 1, wherein the communication fabric comprises one or more Peripheral Component Interconnect Express (PCIe) switches communicatively coupling a plurality of physical components that include a plurality of processors and a plurality of storage elements.

5. The apparatus of claim 1, comprising further program instructions stored on the one or more computer readable storage media, that when executed by the processor, direct the processor to at least:
in the user interface, present options to alter composition of the compute unit to add or remove one or more elements from the compute unit after establishment of the compute unit; and
responsive to receiving an instruction to alter the composition of the compute unit, instruct the management processor to alter the second partitioning in the communication fabric in accordance with the instruction.

6. The apparatus of claim 1, comprising further program instructions stored on the one or more computer readable storage media, that when executed by the processor, direct the processor to at least:

provide via the user interface status related to operation of the compute unit when using the software element.

7. The apparatus of claim 1, wherein the management processor is coupled to at least a storage device that stores a plurality of software elements comprising the software element.

8. The apparatus of claim 7, wherein the plurality of software elements comprise one or more applications and one or more operating systems.

9. The apparatus of claim 1, wherein the first partitioning comprises a first domain-based Peripheral Component Interconnect Express (PCIe) segregation among first ports of at least a first PCIe switch comprising the communication fabric, and wherein the second partitioning comprises a second domain-based PCIe segregation among second ports of at least a second PCIe switch comprising the communication fabric.

10. A method, comprising:
presenting a user interface configured to receive instructions related to deployment of software to compute units;
receiving user selections of a software element for deployment to a compute unit comprising a processing element and a storage element;
responsive to the user selections, instructing a management processor of a communication fabric to deploy the software element for use by the compute unit by at least establishing a first partitioning in the communication fabric between the management processor and the storage element, deploying the software element to the storage element using the first partitioning, de-establishing the first partitioning, and establishing a second partitioning in the communication fabric between the processing element and the storage element comprising the software element, wherein the processing element operates using the software element.

11. The method of claim 10, wherein the processing element boots with a boot image comprising the software element from the storage element over the second partitioning.

12. The method of claim 11, wherein the software element further comprises one or more user applications configured to be executed by the processing element.

13. The method of claim 10, wherein the communication fabric comprises one or more Peripheral Component Interconnect Express (PCIe) switches communicatively coupling a plurality of physical components that include a plurality of processors and a plurality of storage elements.

14. The method of claim 10, further comprising:
in the user interface, presenting options to alter composition of the compute unit to add or remove one or more elements from the compute unit after establishment of the compute unit; and
responsive to receiving an instruction to alter the composition of the compute unit, instructing the management processor to alter the second partitioning in the communication fabric in accordance with the instruction.

15. The method of claim 10, further comprising:
providing via the user interface status related to operation of the compute unit when using the software element.

16. The method of claim 10, wherein the management processor is coupled to at least a storage device that stores a plurality of software elements comprising the software element.

17. The method of claim 16, wherein the plurality of software elements comprise one or more applications and one or more operating systems.

18. The method of claim 10, wherein the first partitioning comprises a first domain-based Peripheral Component Interconnect Express (PCIe) segregation among first ports of at least a first PCIe switch comprising the communication fabric, and wherein the second partitioning comprises a second domain-based PCIe segregation among second ports of at least a second PCIe switch comprising the communication fabric.

19. A user interface system, comprising:
a user interface configured to receive instructions related to deployment of software to compute units;
the user interface configured to receive user selections of a software element for deployment to a compute unit comprising a processing element and a storage element;
a control interface configured to, responsive to the user selections, instruct a management processor of a communication fabric to deploy the software element for use by the compute unit by at least establishing a first partitioning in the communication fabric between the management processor and the storage element, deploying the software element to the storage element using the first partitioning, de-establishing the first partitioning, and establishing a second partitioning in the communication fabric between the processing element and the storage element comprising the software element, wherein the processing element operates using the software element.

20. The management processor of claim 19, comprising:
the user interface configured to present options to alter composition of the compute unit to add or remove one or more elements from the compute unit after establishment of the compute unit; and
responsive to receiving an instruction to alter the composition of the compute unit, instructing the management processor to alter the second partitioning in the communication fabric in accordance with the instruction.

* * * * *